United States Patent [19]

Akachi et al.

[11] Patent Number: 5,127,702
[45] Date of Patent: Jul. 7, 1992

[54] SEAL STRUCTURE FOR MOTOR VEHICLE

[75] Inventors: Keiji Akachi, Gifu; Harumi Kogiso, Inazawa; Kazuo Ogawa; Nobuyuki Okada, both of Ota, all of Japan

[73] Assignees: Toyoda Gosei Co., Ltd., Nishikasugai; Fuji Jukogyo Kabushiki Kaisha, Tokyo, both of Japan

[21] Appl. No.: 660,261

[22] Filed: Feb. 26, 1991

Related U.S. Application Data

[63] Continuation of Ser. No. 448,896, Dec. 12, 1989, abandoned.

Foreign Application Priority Data

Dec. 13, 1988 [JP] Japan .................... 63-161639[U]
Dec. 13, 1988 [JP] Japan .................... 63-161640[U]

[51] Int. Cl.⁵ .............................................. B60J 10/08
[52] U.S. Cl. .............................................. 296/146 F
[58] Field of Search ................... 296/208, 154, 146; 49/502

[56] References Cited

U.S. PATENT DOCUMENTS 4,827,670 5/1989 Kogiso et al. ................ 296/154 X
4,831,710 5/1989 Katoh et al. ................. 296/146 X
4,848,829 7/1989 Kidd ........................... 49/502 X

FOREIGN PATENT DOCUMENTS 61-122938 8/1986 Japan.

Primary Examiner—Margaret A. Focarino
Assistant Examiner—Gary C. Hoge
Attorney, Agent, or Firm—Cushman, Darby & Cushman

[57] ABSTRACT

A seal structure for a front door of a motor vehicle provided with a door mirror bracket at a front end of a door belt line is composed of a roof weather strip attached along a door opening of a car body, and a door weather strip attached along a periphery of a door panel. The door weather strip is provided with an end portion covering a lower portion of the door mirror bracket and a front upper end of a door inner panel to which a lower end of the door mirror bracket is jointed. An upper part of the end portion has a thickness large enough to fill the step between the door mirror bracket and the door inner panel whereby the end portion of the door weather strip has a continuous smooth surface from its lower part to its upper part to effect a good seal with the opposed roof weather strip when the front door is closed.

4 Claims, 6 Drawing Sheets

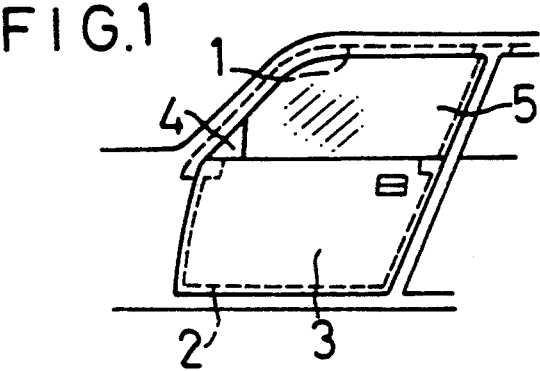
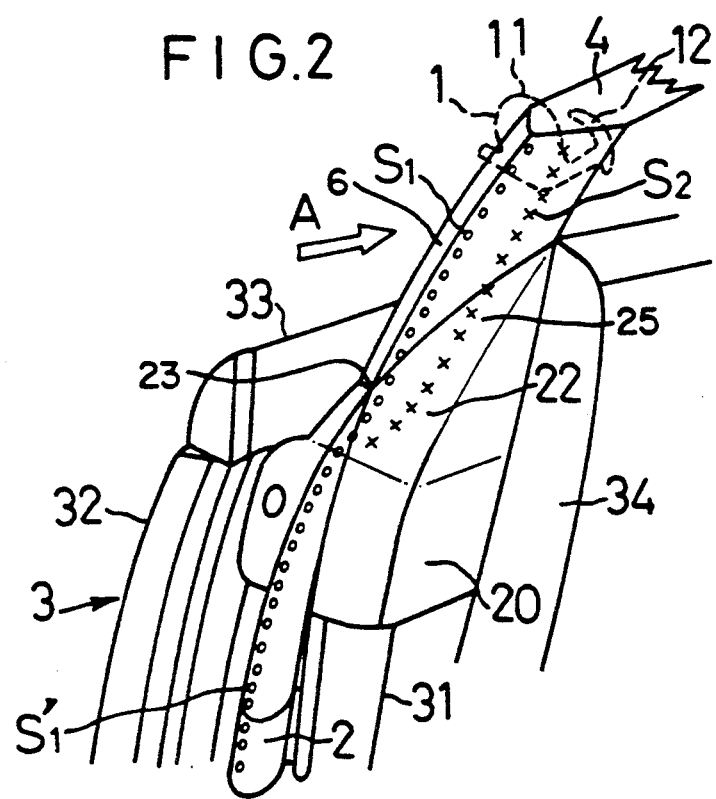

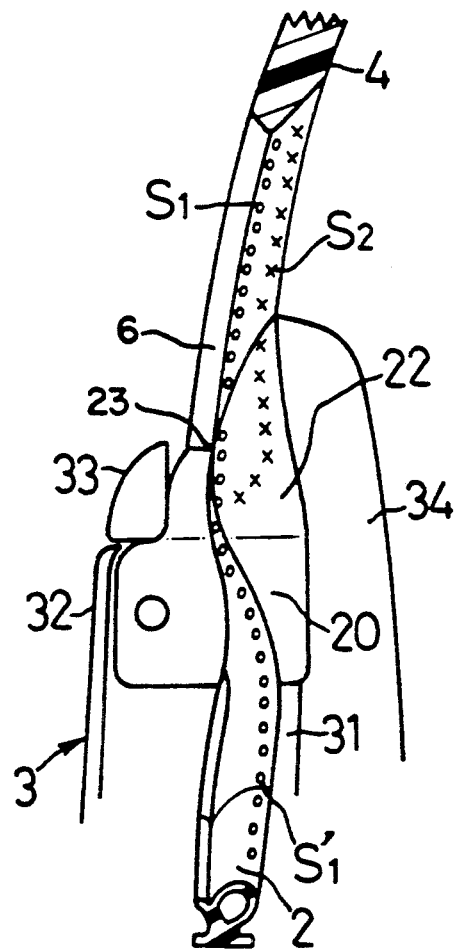

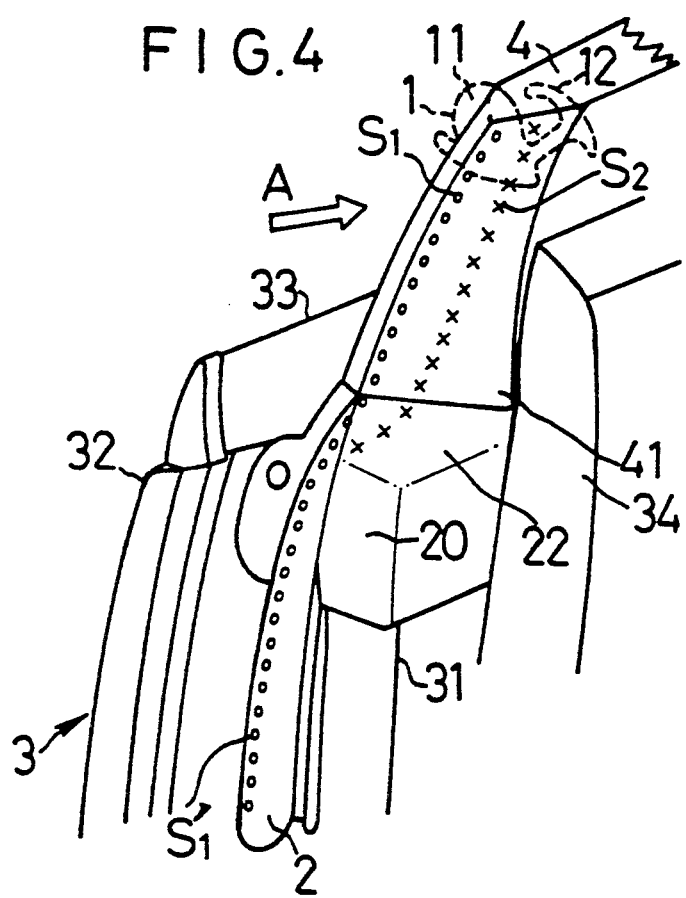

SEAL STRUCTURE FOR MOTOR VEHICLE

This is a continuation of application Ser. No. 07/448,896, filed on Dec. 12, 1989, now abandoned.

BACKGROUND OF THE INVENTION

1. Field of the Invention

The present invention relates to a seal structure for a motor vehicle, and more particularly to a seal structure for a motor vehicle provided with a door mirror bracket for retaining a door mirror.

2. Description of the Prior Art

A motor vehicle is ordinarily provided with a triangular door mirror bracket which is mounted on a front end of a door belt line. Meanwhile, to an upper half portion of a door opening of a car body is attached a roof weather strip for sealing a periphery of a front door glass. A roof weather strip is continuously attached to a front pillar, a roof side, and a center pillar. When a front door is closed, a periphery of each of a door mirror bracket and a front door glass comes into pressure contact with the roof weather strip (Japanese unexamined Utility Model publication No. Sho 61-122938).

FIGS. 6 and 7 illustrate a joint portion of the door mirror bracket 4 and a front upper end of a door inner panel 31 of the conventional front door 3.

A door weather strip 2 composed of a tubular extruded body is attached along a periphery of the front door 3. At a front end of the door weather strip 2 is formed a die-molded end portion 20 which covers a front upper corner of the door inner panel 31 and a lower portion of the door mirror bracket 4. The door inner panel 31 locates on an inside of the door mirror bracket 4 to form a step between the door inner panel 31 and the door mirror bracket 4. Accordingly, an upper part 21 of the end portion 20, which covers the lower portion of the door mirror bracket 4, is formed into an inclined surface. In the drawings, reference numeral 32 designates a door outer panel, 33 designates a door outer weather strip, 34 designates a trim for covering an inside surface of the front door 3.

When the front door 3 is closed, the periphery of the front door glass, a front edge of the door mirror bracket 4, and the door weather strip 2 continuously come into pressure contact with the roof weather strip 1 to effect a seal between the front door 3 and the door opening. However, the sealing performance of the roof weather strip 1 tends to be insufficient in the end portion 20 of the door weather strip 2 because of the formation of the inclined upper part 21.

Recently, in order to improve the sealing performance of the roof weather strip, there has been employed a two-point seal structure wherein the roof weather strip comes into contact with an opposite door member at two points thereby forming two seal lines with the opposite door member.

In the seal structure illustrated in FIGS. 6 and 7, the roof weather strip 1 is provided with a tubular main seal portion 11 and a lip-shaped sub-seal portion 12. The seal portions 11 and 12 come into pressure contact with the opposite door member, respectively, thereby forming two parallel seal lines, that is a main seal line $S_1$ (mark o) and a sub-seal line $S_2$ (mark x). The main seal line $S_1$ is continuously connected to the seal line $S_1'$ (mark o) of the door weather strip 2 which is to come into pressure contact with a lower half portion of the door opening while the sub-seal line $S_2$ is connected to the seal line $S_1'$ in the inclined upper part 21 of the end portion 20.

However, the experiments by the present inventors have proved that the sub-seal line $S_2$ is liable to be disordered or broken in the end portion 20, especially in the inclined upper part 21 thereof so as not to be continuously connected to the seal line $S_1'$ thereby lowering the sealing performance of the roof weather strip in the end portion 20.

SUMMARY OF THE INVENTION

It is an object of the present invention to provide a seal structure having an improved sealing performance between a roof weather strip attached along a door opening of a motor vehicle, and an end portion of the door weather strip covering a lower portion of a door mirror bracket and a front upper end of a door inner panel.

In order to achieve the above-described object, in accordance with the present invention, a lower part of the end portion of the door weather strip covers the front upper end of the door inner panel, and an upper part of the end portion, which covers the lower portion of the door mirror bracket are formed to have a continuous smooth surface without any step. The above-described continuous smooth surface is realized by the structure wherein the upper part of the end portion has a thickness large enough to fill the step between the door mirror bracket and the door inner panel, or by another structure wherein the lower end portion of the door mirror bracket has a thickness gradually increasing downwardly so that the lower end of the door mirror bracket is flush with the door inner panel. Both of these structures provide orderly continuous seal lines between the roof weather strip and a periphery of the front door, from a front door glass to the end portion of the door weather strip by way of the door mirror bracket.

BRIEF DESCRIPTION OF THE DRAWINGS

FIG. 1 is a front view of a front door of a motor vehicle, of which a periphery is sealed by a weather strip;

FIGS. 2 and 3 illustrate a first embodiment of a seal structure according to the present invention;

FIG. 2 is a perspective view of a front end portion of a front door to which a door weather strip is attached;

FIG. 3 is an end view taken in the direction of the arrow A of FIG. 2;

FIGS. 4 and 5 illustrate a second embodiment of a seal structure according to the present invention;

FIG. 4 is a perspective view of a front end portion of a front door to which a door weather strip is attached;

FIG. 5 is an end view taken in the direction of the arrow A of FIG. 4;

FIG. 6 is a perspective view of a front end portion of a front door to which a door weather strip is attached; and FIG. 7 is an end view taken in the direction of the arrow A of FIG. 6.

DETAILED DESCRIPTION OF THE EMBODIMENTS

Figure 5:
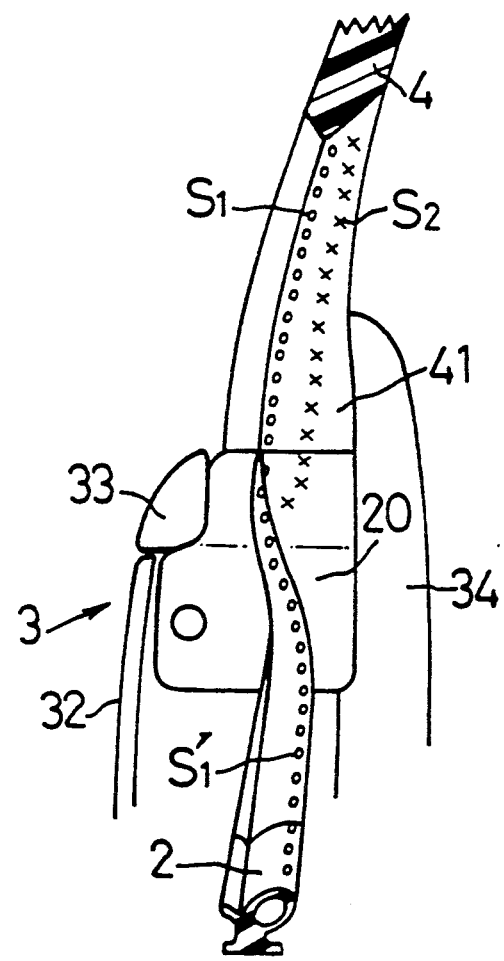
Figure 6:
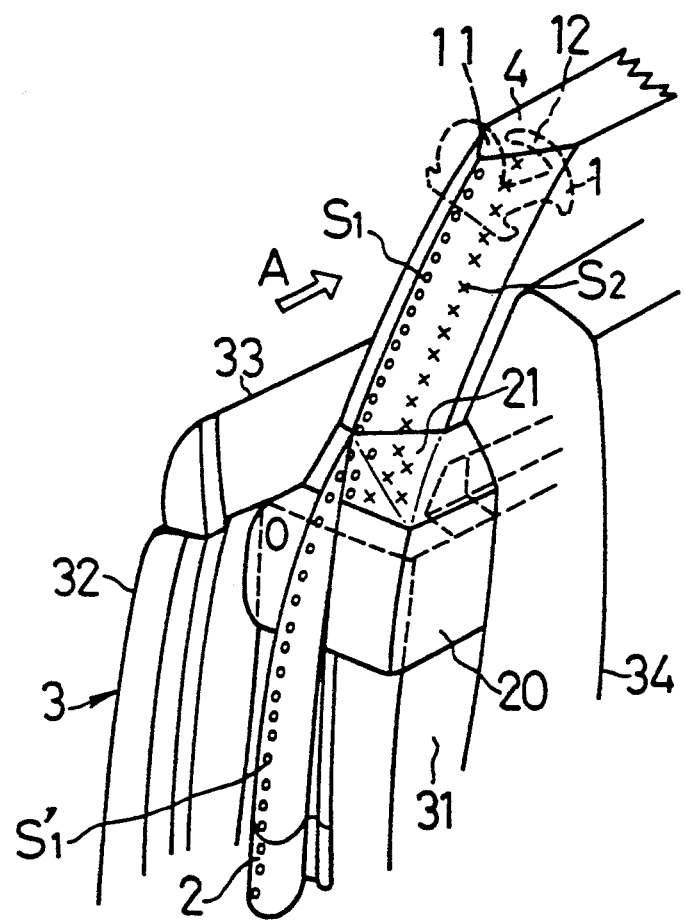
FIGS. 6 and 7 illustrate a conventional seal structure.
Figure 7:
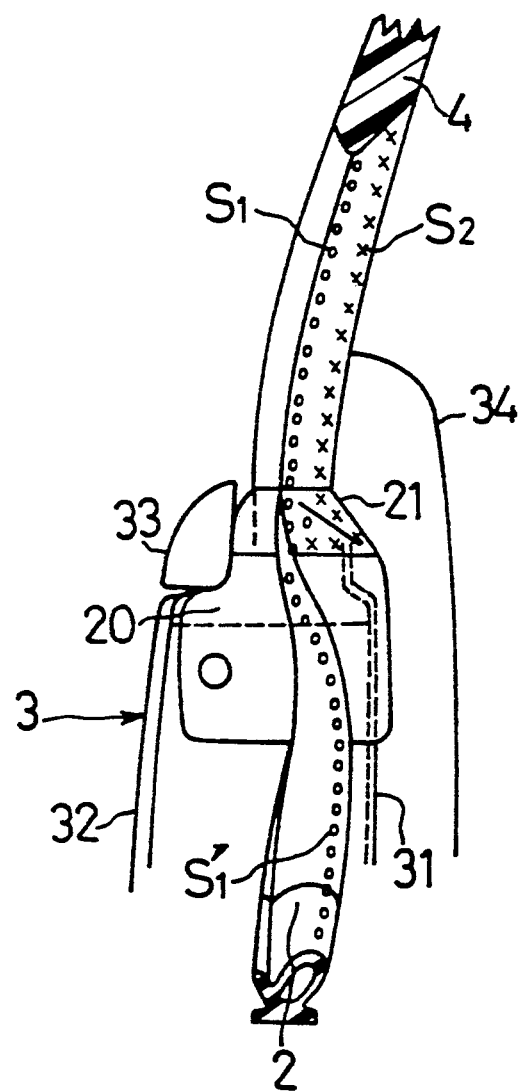

As shown in FIG. 1, to a front end of a door belt line of a front door 3 is attached a triangular plate-shaped door mirror bracket 4 made of synthetic resin. The door mirror bracket 4 is secured to a door inner panel 31 (FIG. 2) by a stay (not shown) which projects from a lower end of the door mirror bracket 4 downwardly.

A roof weather strip 1 is attached to an upper half portion of a door opening of a car body, and is brought into pressure contact with a front edge of the door mirror bracket 4 and a periphery of a front door glass 5 when the front door 3 is closed.

An extruded tubular door weather strip 2 is attached along a periphery of the front door 3.

FIGS. 2 and 3 illustrate a first embodiment of a seal structure according to the present invention.

The front door 3 has a thickness greater than that of the door mirror bracket 4, and the door inner panel 31 locates on an inside surface of the door mirror bracket 4.

The roof weather strip 1 is provided with a tubular main seal portion 11 and a lip-shaped sub-seal portion 12, which come into pressure contact with the periphery of the front door glass 5 and the front or leading edge 6 of the door mirror bracket 4, thereby forming parallel seal lines $S_1$ and $S_2$.

And a molded end portion 20 is formed at an upper end of the door weather strip 2 so that a lower part thereof covers a front upper end of the door inner panel 31 while an upper part 22 thereof covers a lower portion of the door mirror bracket 4. As illustrated, upper part 22 has an upper forward edge 23 which contacts the leading edge 6 of the door mirror bracket 4 at a predetermined vertical condition. An inside section of the upper part 22 of the end portion 20, in which the sub-seal line $S_2$ is formed, extends upwardly along the front edge of the door mirror bracket 4 until reaching an upper end of a trim 34 to thereby define an inner side extension 25. As can be seen, inner side extension 25 extends vertically upwardly relative to the predetermined vertical position where the upper forward edge 23 of the upper part 22 contacts the leading edge 6 of the door mirror bracket. The thickness of the inner side extension 25 and the upper part 22 of the end portion 20 are gradually increased downwardly so that the upper part 22 fills the step between the door mirror bracket 4 and the door inner panel 31. This results in the upper part 22 and the inner side extension 25 of the end portion 20 forming a continuous and smooth seal surface with the door mirror bracket 4 and the lower part of the end portion 20. In the drawings, reference numerals 32 and 33 designate a door outer panel and a door outer weather strip, respectively.

In the front door 3 having the above-described construction, the seal line $S_1$ is continuously formed from the front door glass 5 to the end portion 20 of the weather strip 2 through the door mirror bracket 4, and continuously connected to the seal line $S_1'$ of the door weather strip 2 while the sub-seal line $S_2$ is also continuously formed inside and along the seal line $S_1$ and connected to the seal line $S_1'$. Since the surface of the upper part 22 of the end portion 20 is smooth and flat from the top to the bottom thereof, the seal line $S_2$ is formed in the orderly and unbroken state. The thus obtained seal structure provides two continuous seal lines $S_1$, $S_2$ with excellent sealing performance.

FIGS. 4 and 5 illustrate a second embodiment of a seal structure according to the present invention. In the second embodiment, the thickness of a door mirror bracket 4 is gradually increased downwardly so as to be flush with an inside surface of a door inner panel 31. A lower end of a thick-walled portion 41 of the door mirror bracket 4 and a front upper end portion of the door inner panel 31 are covered with a thin-walled end portion 20 of a door weather strip 2. This results in the door mirror bracket 4, an upper part 22 of the end portion 20, and a lower part thereof forming a smooth and flat surface without any step.

The other construction of the seal structure of the second embodiment is substantially the same as that of the first embodiment.

In the second embodiment, there are formed seal lines $S_1$, $S_1'$ continuously extending from a front edge of the door mirror bracket 4 to the door weather strip 2, and a seal line $S_2$ extending in the smooth and flat surface of the upper part 22 of the weather strip 2 and connected to the seal line $S_1'$ in the orderly and unbroken state, thereby providing a double seal structure with excellent sealing performance.

What is claimed is:

1. A seal structure for a front door of a motor vehicle provided with a door mirror bracket at a front end of a door belt line, comprising:

a roof weather strip attached along a door opening of a car body to come into pressure contact with a front edge of the door mirror bracket;

a door weather strip attached along a periphery of a door panel to come into pressure contact with a lower half portion of the door opening;

a molded end portion formed at an upper end of said door weather strip, said molded end portion having an upper part and a lower part, said upper part covering a lower portion of the door mirror bracket and said lower part covering a front upper end of a door inner panel, a front lower end portion of said roof weather strip coming into pressure contact with said molded end portion of said door weather strip when the front door is closed, said upper part having a upper forward edge, the door mirror bracket having a leading edge, said upper forward edge of said upper part contacting said leading edge of the door mirror bracket at a predetermined vertical position, said molded end portion further comprising an inner side extension which extends vertically upwardly relative to said predetermined vertical position, said upper part and said inner side extension having such a thickness between the lower portion of the door mirror bracket and the front upper end of the door inner panel, as to define a smooth transition from said front upper end of the door inner panel and the door mirror bracket and a smooth and flat surface in said molded end portion, whereby a continuous and smooth seal is formed with said smooth and flat surface of said molded end portion flush with a seal surface of the door mirror bracket.

2. A seal structure according to claim 1, wherein a main seal line is formed in said roof weather strip with the front edge of the door mirror bracket, and a sub-seal line is formed in said roof weather strip with the front edge of the door mirror bracket inside and along said main seal line, and said sub-seal line extends along said upwardly extended part of said upper part of said molded end portion and joins said main seal line in said molded end portion.

3. A seal structure for a front door of a motor vehicle provided with a door mirror bracket at a front end of a door belt line, comprising:

a roof weather strip attached along a door opening of a car body to come into pressure contact with a front edge of the door mirror bracket;

a door weather strip attached along a periphery of a door panel to come into pressure contact with a lower half portion of the door opening;

a molded end portion formed at an upper end of said door weather strip, said molded end portion having an upper part and a lower part, said upper part covering a lower portion of the door mirror bracket and said lower part covering a front upper end of a door inner panel, a front lower end portion of said roof weather strip coming into pressure contact with said molded end portion of said door weather strip when the front door is closed, the thickness of the door mirror bracket gradually increasing downwardly so that the lower end of the door mirror bracket and the front upper end of the door inner panel are flush with each other, and said molded end portion of said door weather strip has a uniform thickness so as to form a smooth and flat surface in said molded end portion, whereby a continuous and smooth seal is formed with said smooth and flat surface of said molded end portion flush with a seal surface of the door mirror bracket.

4. A seal structure according to claim 3, wherein main seal line is formed in said roof weather strip with the front edge of the door mirror bracket, and a sub-seal line is formed in said roof weather strip with the front edge of the door mirror bracket inside and along said main seal line, and said sub-seal line joins said main seal line in said molded end portion.

* * * * *